United States Patent
Chintada (10) Patent No.: US 8,060,646 B2
(45) Date of Patent: Nov. 15, 2011

(54) ADAPTIVE REFRESH RATE FOR HEADER COMPRESSION OVER LONG PROPAGATION CHANNELS AND RELATED METHODS

(75) Inventor: Lakshmana Chintada, Chandler, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 773 days.

(21) Appl. No.: 12/040,084

(22) Filed: Feb. 29, 2008

(65) Prior Publication Data
US 2009/0219929 A1    Sep. 3, 2009

(51) Int. Cl.
*G06F 13/00*    (2006.01)
(52) U.S. Cl. ...................................................... 709/235
(58) Field of Classification Search .................. 709/235; 704/500, 503
See application file for complete search history.

(56) References Cited

U.S. PATENT DOCUMENTS

| 7,197,687 B2 | 3/2007 | Imura et al. | |
| 2008/0151861 A1* | 6/2008 | Zhang | 370/349 |

* cited by examiner

*Primary Examiner* — Robert B Harrell
(74) *Attorney, Agent, or Firm* — Booth Udall, PLC (57) ABSTRACT

An adaptive telecommunications packet transmission system. Implementations may include a compression engine configured to compress a header of at least one uncompressed packet and to send at least one compressed packet corresponding to the at least one uncompressed packet across a communication channel coupled to the compression engine. A refresh rate calculator may be included that is configured to receive at least one error and at least one success from a decompression engine and calculate an adaptive refresh rate based on the at least one error or the at least one success. The refresh rate calculator may be configured to communicate an adaptive refresh rate to the compression engine. The compression engine may be configured to transmit at least one uncompressed packet across the communication channel according to the adaptive refresh rate received from the refresh rate calculator.

25 Claims, 4 Drawing Sheets

ADAPTIVE REFRESH RATE FOR HEADER COMPRESSION OVER LONG PROPAGATION CHANNELS AND RELATED METHODS

BACKGROUND

1. Technical Field

Aspects of this document relate generally to telecommunication systems and methods of telecommunication utilizing data packets.

2. Background Art

Telecommunication systems conventionally transmit data in discrete segments, commonly called packets. A wide variety of conventional communication protocols describe the information included in a packet and the methods used to transmit and handle them. Many conventional packet formats (IPv4 and IPv6, for example) describe packets that each have a header of fixed size that contains information enabling the telecommunication system to know, for example, where the packet is from and where to route it. Using the header information, the telecommunication system is able to receive and send the rest of the data contained in the packet to the desired location. Packets are conventionally used to transmit data in a wide variety of telecommunications applications including satellite, wireless, wired, microwave, and infrared-based telecommunication infrastructures.

SUMMARY

Implementations of a first adaptive telecommunications packet transmission system may include a compression engine configured to compress a header of at least one uncompressed packet and send at least one compressed packet corresponding to the at least one uncompressed packet across at least one communication channel coupled to the compression engine. A decompression engine may be coupled to the at least one communication channel and configured to receive from the at least one communication channel the at least one compressed packet and to decompress the header of the at least one compressed packet. The decompression engine may be configured to report at least one error if the header of the at least one compressed packet cannot be decompressed and to report at least one success if the header of the at least one compressed packet can be decompressed. A refresh rate calculator may be coupled to the decompression engine and configured to receive the at least one error and the at least one success from the decompression engine and calculate an adaptive refresh rate in response to the at least one error or the at least one success or timeout basis. The refresh rate calculator may be configured to send at least one uncompressed packet containing the adaptive refresh rate across the at least one communication channel to the compression engine. The compression engine may be configured to transmit at least one uncompressed packet across the communication channel according to the adaptive refresh rate received from the refresh rate calculator. Or, in the event no refresh rate is received from the refresh rate calculator, it resets to the previously configured refresh rate and continue.

Implementations of first adaptive telecommunications packet transmission systems may include one, all, or some of the following:

The system may include an adaptive refresh rate feeder configured to receive the at least one uncompressed packet from the communication channel and to transmit the adaptive refresh rate to the compression engine.

The refresh rate calculator may reduce the adaptive refresh rate by dividing an existing adaptive refresh rate by a predetermined value when at least one error is received from the decompression engine.

The predetermined value may be one of two, three, or four.

The refresh rate calculator may increase the adaptive refresh rate by increasing an existing adaptive refresh rate by at least one compressed packet when at least one success is received from the decompression engine.

The at least one communication channel may include a first communication channel and a second communication channel different from the first communication channel.

The first communication channel may include a compressed communication channel and the second communication channel may include an uncompressed communication channel.

The uncompressed packet may be one of an IPv4 packet, an Ethernet packet, and an IPv6 packet.

Implementations of a second adaptive telecommunications packet transmission system may include a compression engine configured to compress a header of at least one uncompressed packet and to send at least one compressed packet corresponding to the at least one uncompressed packet across a communication channel coupled to the decompression engine. A refresh rate calculator may be included that is configured to receive at least one error and at least one success from a decompression engine and calculate an adaptive refresh rate based on the at least one error or the at least one success. A timeout is treated as an error. The refresh rate calculator may be configured to communicate an adaptive refresh rate to the compression engine. The compression engine may be configured to transmit at least one uncompressed packet across the communication channel according to the adaptive refresh rate received from the refresh rate calculator.

Implementations of second adaptive telecommunications packet transmission systems may include one, all, or some of the following.

The system may further include a decompression engine coupled to the communication channel and configured to receive from the communication channel the at least one compressed packet and to decompress the header to the at least one compressed packet. The decompression engine may be configured to report at least one error if the header of the at least one compressed packet cannot be decompressed and to report at least one success if the header of the at least one compressed packet can be decompressed.

The system may further include an adaptive refresh rate feeder configured to receive the adaptive refresh rate from the refresh rate calculator and to transmit the adaptive refresh rate to the compression engine.

The refresh rate calculator may be configured to reduce the adaptive refresh rate by dividing an existing adaptive refresh rate by a predetermined value when at least one error is received from the decompression engine.

The predetermined value may be one of two, three, or four.

The refresh rate calculator may configured to increase the adaptive refresh rate by increasing an existing adaptive refresh rate by at least one compressed packet when at least one success is received from the decompression engine.

Implementations of first and second adaptive telecommunication systems may utilize a method of calculating an adaptive refresh rate including receiving at least one error from a decompression engine indicating a non-decompressable packet and calculating a new adaptive refresh rate by dividing an existing adaptive refresh rate by a predetermined value. The method may also include receiving at least one success from a decompression engine indicating a decompressable packet, calculating a new adaptive refresh rate by increasing the adaptive refresh rate by at least one compressed packet, and transmitting the new adaptive refresh rate to a compression engine.

Implementations of a method of calculating an adaptive refresh rate may include one, all, or some of the following:

Sending a pattern of compressed and uncompressed packets according to the new adaptive refresh rate.

The predetermined value may be one of two, three, and four.

The at least one error may include the sum of individual errors over a predetermined interval of time.

The at least one error may include the sum of individual non-recoverable errors over a predetermined interval of time.

The at least one success may include the sum of individual successes over a predetermined interval of time.

The predetermined value may be a function of the at least one error, the predetermined interval of time, or both the at least one error and the predetermined interval of time.

Implementations of first and second adaptive telecommunication systems may utilize a method of transmitting an adaptive refresh rate including receiving a plurality of compressed packets from a compression engine through a first communication channel and decompressing the plurality of compressed packets with a decompression engine. The method may further include transmitting at least one error resulting from the failure of at least one of the plurality of compressed packets to decompress and transmitting a least one success resulting from the successful decompression of at least one of the plurality of compressed packets to a refresh rate calculator coupled to the decompression engine. The method may include receiving a new adaptive refresh rate from the decompression engine calculated by dividing an existing adaptive refresh rate by a predetermined value if at least one error was transmitted; if at least one success was transmitted, the method may include receiving a new adaptive refresh rate from the decompression engine calculated by increasing the adaptive refresh rate by at least one compressed packet. The method may also include forming the new adaptive refresh rate into at least on uncompressed packet formatted in a predetermined packet format and transmitting the at least one uncompressed packet through a second communication channel to the compression engine.

Implementations of a method of transmitting an adaptive refresh rate may include one, all, or some of the following:

The predetermined packet format may be one of IPv4, IPv6, and Ethernet.

Calculating the new adaptive refresh rate may include dividing an existing refresh rate by a predetermined value.

The predetermined value may be one of two, three, or four.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended and/or assembly procedures for an adaptive packet transmission system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such adaptive packet transmission systems and implementing components, consistent with the intended operation.

Systems

Figure 1:
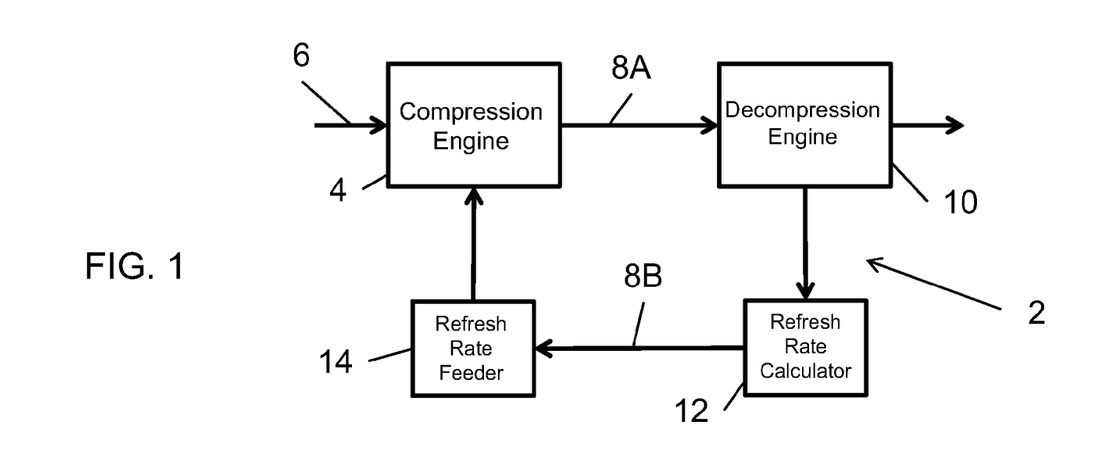
FIG. 1 is a block diagram of a first implementation of an adaptive packet transmission system.

Referring to FIG. 1, a first implementation of an adaptive packet transmission system (adaptive telecommunications packet transmission system) 2 is illustrated. The system 2 may include a compression engine 4 that is configured to compress the header information of at least one uncompressed packet entering the compression engine 4 at inlet 6. "Compression" means the use of methods and systems known to those of ordinary skill in the art to reduce the size of the header portion of a packet. Relevant teachings regarding packets, packet headers, and packet header compression techniques can be found in U.S. Pat. No. 7,197,687 to Imura et al., entitled "Header Compressed Packet Receiving Apparatus and Method," issued Mar. 27, 2007, the contents of which are hereby incorporated herein by reference. "Compressed packet" means a packet containing compressed header information; in contrast, an "uncompressed packet" is a packet containing full header information. Many conventional packet header techniques accomplish packet compression by not including data in those portions of the header that will be redundant from sent packet to sent packet (i.e., the sender's IP address, for example). The compression engine 4 may compress the uncompressed packets from the inlet 6 using any conventional or custom packet compression method or algorithm producing at least one compressed packet. In various implementations of a compression engine 4, the at least one compressed packet produced may correspond 1:1 with an uncompressed packet from the inlet 6; in other implementations, other ratios, such as 2:1 or 1:2 may be used, depending upon the compression method or algorithm used to compress the headers, the packet data, or both.

The compression engine 4 is coupled to a communication channel 8A into which the compression engine 4 transmits the at least one compressed packet. The compression engine 4 is configured to send the at least one compressed packet along with at least one uncompressed packet into the communication channel 8A according to a defined adaptive refresh rate. The adaptive refresh rate is the ratio of the number of compressed packets to the number of uncompressed packets being sent by the compression engine 4. For example, a refresh rate of ten would correspond to ten compressed packets being sent into the communication channel 8 for every one uncompressed packet sent. Because the use of compressed packets is intended to maximize the bandwidth of the communication channel 8, data corruption and disconnection risks are minimized by regularly sending an uncompressed packet containing full header information (or sending an uncompressed packet according to a refresh rate). These risks are substantial in, for example, satellite applications where there exist long delays in transmission between the sending and receiving ends of the communication link. An adaptive refresh rate is a refresh rate that is dynamically calculated by the adaptive packet transmission system 2 in response to feedback about data integrity and disconnection than contains a varying ratio of compressed packets to uncompressed packets. If no updates to the refresh rate are received from the refresh rate feeder within a predetermined time interval, the compression engine 4 continues with a user configured refresh rate.

The communication channel 8A is coupled to a decompression engine 10 which is configured to decompress the compressed packet headers. The decompression engine 10 may utilize any of a wide variety of conventional methods of decompression to do so. While attempting to decompress a given compressed packet's header, or to decompress a given compressed packet, the decompression engine 10 may be unable to do so, for any of a wide variety of reasons. The failure of the decompression engine to decompress at least one compressed packet causes the decompression engine to output or receive at least one error corresponding to the failed compressed packet. An error may be, by non-limiting example, recoverable or non-recoverable, composed of the sum of individual compression failures over a predetermined period of time, reported by or to the decompression engine, created by the decompression engine in response to the failure of a given compressed packet to decompress, or composed of any other signal, flag, response, or action generated by or received from a conventional decompression method, algorithm or routine.

While the decompression engine 10 is configured to report at least one error, it is also configured to output or to receive at least one success corresponding to the successful decompression of a compressed packet. A success, by non-limiting example, may be the result of the recovery of a recoverable error, the sum of individual successful decompressions over a predetermined period of time, reported by or to the decompression engine, created by the decompression engine in response to the decompression of a compressed packet, or composed of any other signal, flag, response, or action generated by or received from a conventional decompression method, algorithm, or routine.

The decompression engine 10 communicates errors and/or successes to a refresh rate calculator 12 configured to calculate an adaptive refresh rate. If an error is received, the refresh rate calculator calculates a new adaptive refresh rate by dividing an existing adaptive refresh rate by a predetermined value. The predetermined value may be, by non-limiting example, two, three, four or any other number (integer or otherwise). For the exemplary purposes of this disclosure, the predetermined value used is two. The effect of reducing the refresh rate by two, for example, is that when an error is received by the refresh rate calculator 12, the existing refresh rate is halved. In other words, if the existing refresh rate was ten, once an error is received, the new refresh rate is five, meaning than an uncompressed packet is now transmitted twice as often as before. Such an arrangement permits the adaptive refresh rate to be rapidly reduced when only a few errors are received.

If a success is received by the refresh rate calculator 12, the refresh rate calculator 12 is configured to calculate a new adaptive refresh rate by increasing the rate by at least one compressed packet. For example, if the existing adaptive refresh rate is ten compressed packets to every one uncompressed packet, the refresh rate calculator 12 may increase the rate to eleven compressed packets to every one uncompressed packet. Because the refresh rate calculator 12 is configured to increase the adaptive refresh rate relatively slowly when successes have been received, implementations of adaptive packet transmission systems 2 may be much more responsive to errors than to successes, reducing the adaptive refresh rate rapidly when errors are reported, and building the adaptive refresh rate up slowly when successes are received.

In implementations of adaptive packet transmission systems that define errors and successes as a sum of individual packet-level errors or successes over a predetermined interval of time, the refresh rate calculator 12 may wait that predetermined interval of time or another predetermined interval of time (which may be longer or shorter) before calculating a new adaptive refresh rate. In these implementations, the response of the system may occur only after a predetermined number of errors in a predetermined time has occurred, preventing rapid changes to the adaptive refresh rate and smoothing the response. In addition, predetermined limits may be included in implementations of the refresh rate calculator 12 that prevent it from calculating new adaptive refresh rates in excess or below certain predetermined threshold values (i.e., a refresh rate greater than 1000 will not be allowed to prevent risk of catastrophic communication failure, etc).

The refresh rate calculator 12 may be coupled to a communication channel 8B and configured to form the new adaptive refresh rate into at least one uncompressed packet in a predetermined format. For the exemplary purposes of this disclosure, the format may be the IPv4 packet format. Once the at least one uncompressed packet containing the new adaptive refresh rate in computer readable form has been formed, the refresh rate calculator 12 may transmit the at least one uncompressed packet into the communication channel 8B. The communication channels 8A, 8B may be different communication channels (a first communication channel and a second communication channel) or the same communication channel. For example, the first communication channel may be a wireless radio communication channel and the second communication channel may be a wired communication channel. For the exemplary purposes of this disclosure the first and second communication channels are different from each other, and the second communication channel may be wired or a "split path" communication channel that includes at least two different communication protocols along its distance. In addition, either of the channels carrying predominantly compressed packets may be referred to as a compressed channel, while a channel carrying predominately uncompressed packets may be referred to as an uncompressed channel.

In particular implementations, the communication channel may be the same channel and not include separate first and second communication channels 8A, 8B. In such implementations, the ability of the system to quickly respond to decompression failures may be some what compromised since the same channel experiencing interference is also the one being used to attempt to reduce the refresh rate.

In implementations of an adaptive packet transmission systems 2 that form the adaptive refresh rate into an uncompressed packet using a standard predetermined format (such as IPv4), the uncompressed packet may be able to travel over both wired and split path communication channel types. Since implementations of adaptive packet transmission systems may not have to rely on the integrity of the same communication channel to transmit both compressed packets and the at least one packet containing the adaptive refresh rate, the adaptive refresh rate may be successfully transmitted even when the first communication channel has become substantially inoperable. For those implementations where the second communication channel is either inoperable or not available, a user of the adaptive packet transmission system 2 may establish a pseudo-adaptive refresh rate by entering a refresh rate into the compression engine 4 as a preset parameter. The system may then continue to operate using that pseudo-adaptive refresh rate until the user once again decides to change the rate in response to telecommunication conditions.

The communication channel 8B may be coupled to a refresh rate feeder 14 that is configured to receive the uncompressed packet containing the new adaptive refresh rate from the communication channel 8B. The refresh rate feeder 14 then is transmits the new adaptive refresh rate to the compression engine 4. The refresh rate feeder 14 may extract the data containing the new adaptive refresh rate from the at least one uncompressed packet or may directly pass the at least one uncompressed packet containing the adaptive refresh rate to the compression engine 4, depending upon the particular implementation of an adaptive packet transmission system utilized. Once the refresh rate feeder 14 has communicated the new adaptive refresh rate to the compression engine 4, the compression engine 4 utilizes the new adaptive refresh rate for sending out sequences of compressed and uncompressed packets.

Implementations of telecommunications systems utilizing implementations of adaptive packet transmission systems 2 can comprehend problems and successes with the compressed communication channel and dynamically feed back to the compression engine 4 a predetermined response in the form of a changing adaptive refresh rate. Use of an adaptive refresh rate may be particularly useful when interference in wireless telecommunication applications utilizing implementations of adaptive packet transmission systems is encountered. For example, if rainfall began to occur between the transmitting and receiving side of a wireless communication channel, it is likely that the decompression engine 10 would begin to report errors to the refresh rate calculator 12, which would then respond by rapidly reducing the existing adaptive refresh rate by dividing by two. Because the at least one uncompressed packet containing the new adaptive refresh rate may be sent along a second communication channel not identical to the wireless communication channel (like a wired communication channel), the new adaptive refresh rate may be reliably transmitted to the refresh rate feeder 14 with a reduced risk of loss. The new adaptive refresh rate may therefore be quickly implemented by the compression engine 4, and preserve the integrity of the wireless communication channel in spite of the sudden and severe interference. When a wireless media channel is used between the refresh rate calculator and the refresh rate feeder, the same updated refresh rate update packet may be sent at predetermined times to avoid loss.

Figure 2:
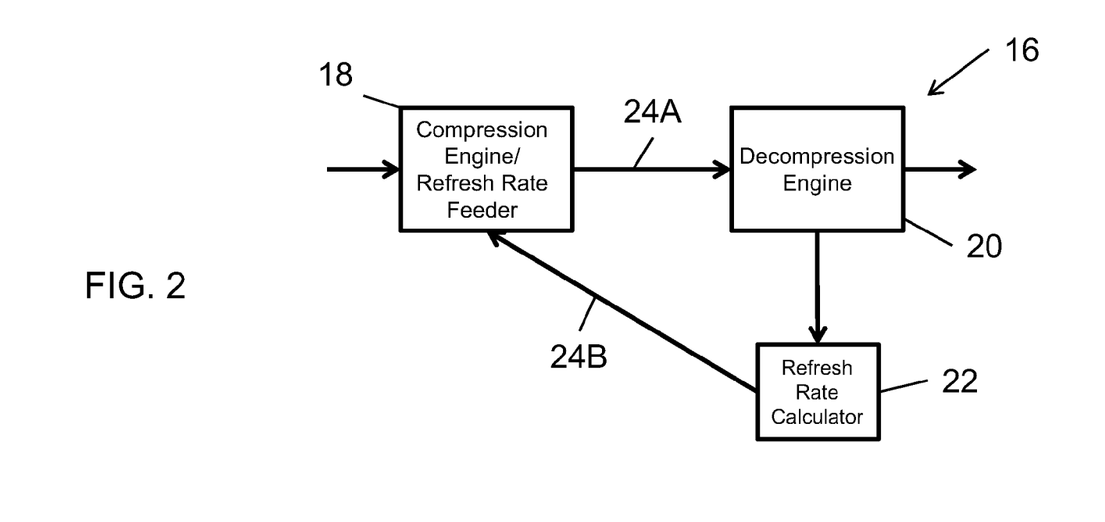
FIG. 2 is a block diagram of a second implementation of an adaptive packet transmission system.

While the implementation of an adaptive packet transmission system 2 illustrated in FIG. 1 has each of the compression engine 4, the decompression engine 10, the refresh rate calculator 12, and the refresh rate feeder 14 as separate and distinct units coupled together, other implementations of adaptive packet transmission systems may include various combinations of these units. Referring to FIG. 2, an implementation of an adaptive packet transmission system 16 is illustrated. In this implementation, the compression engine and refresh rate feeder have been combined into a single unit, forming compression engine/refresh rate feeder 18. While the function and configuration of the compression engine/refresh rate feeder 18 is substantially similar to the operation of the units described in the implementation illustrated in FIG. 1, the function of the refresh rate feeder portion may be limited to translating the new adaptive refresh rate contained in the uncompressed packet into a form directly usable by the compression engine portion. In such implementations, the compression engine/refresh rate feeder 18 is coupled directly to both the decompression engine 20 and the refresh rate calculator 22. Implementations of adaptive packet transmission systems 16 may also include a communication channel having a first communication channel 24A and a second communication 24B different from the first, functioning similarly to those described for the implementation illustrated in FIG. 1.

Figure 3:
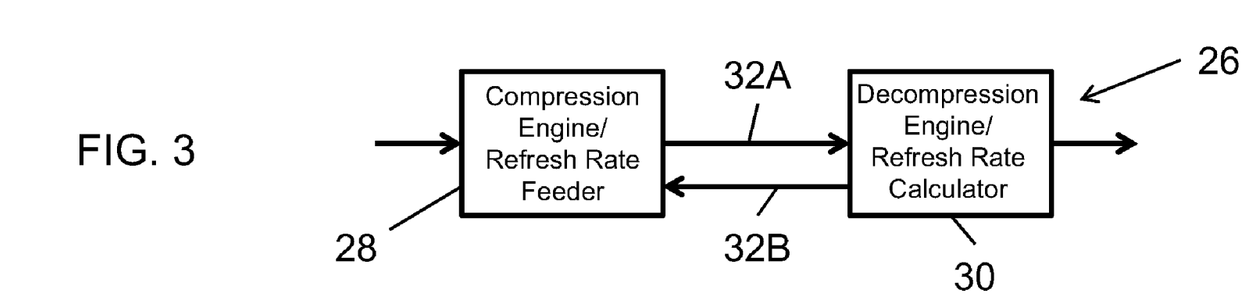
FIG. 3 is a block diagram of a third implementation of an adaptive packet transmission system.

Referring to FIG. 3, another implementation of an adaptive packet transmission system 26 is illustrated. As illustrated, the compression engine and refresh rate feeder are combined into a compression engine/refresh rate feeder 28; the decompression engine and the refresh rate calculator are also combined into a decompression engine/refresh rate feeder 30. Each of these single units performs substantially the same functions and are similarly configured to the individual units described in the implementation illustrated in FIG. 1. Because of the combination of the units, the compression engine/refresh rate feeder 28 may be directly coupled to the decompression engine/refresh rate calculator 30 at the communication channel. If the communication channel contains a first communication channel 32A and a second communication channel 32B, the compression engine/refresh rate feeder 28 and the decompression engine/refresh rate calculator 30 may be coupled to each other at two points.

Figure 4:
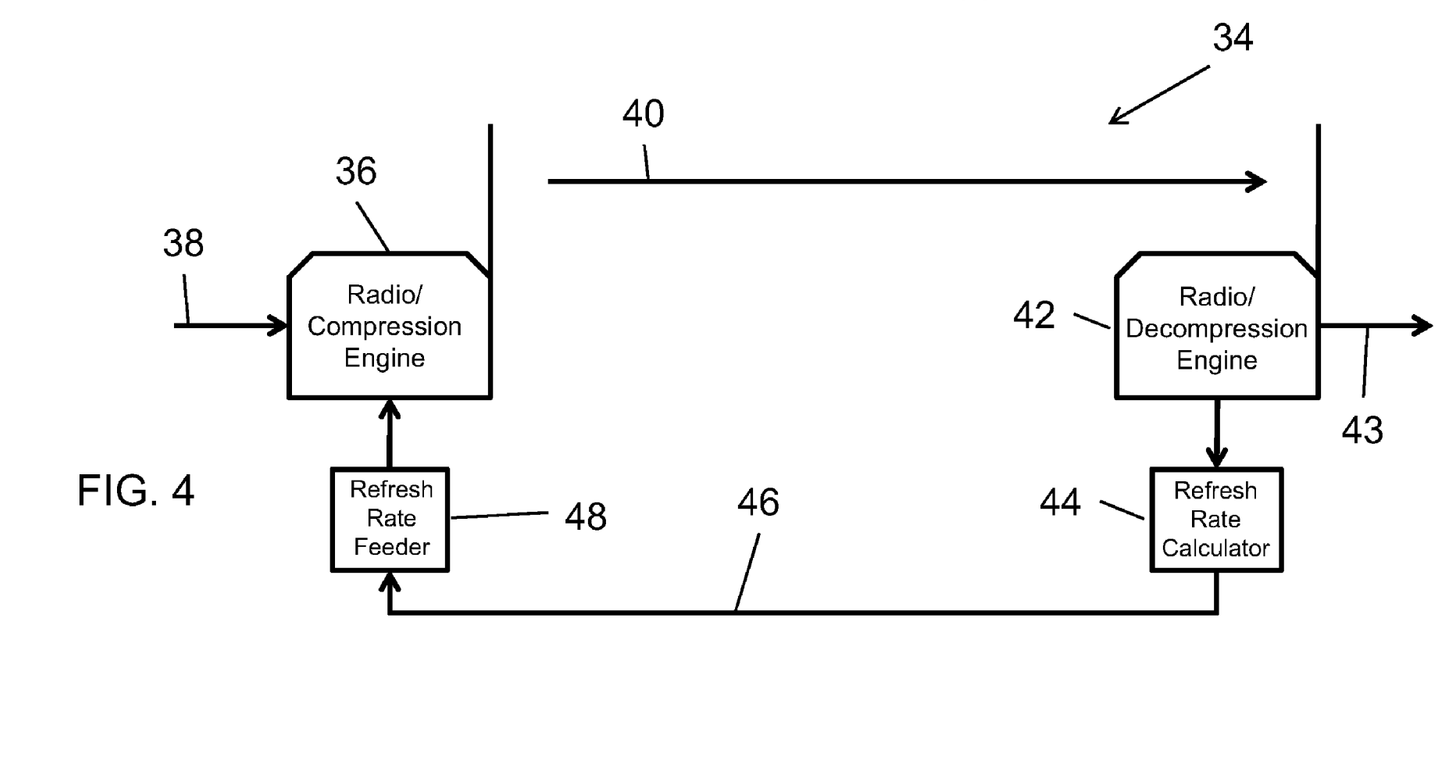
FIG. 4 is a diagram of the components of an exemplary telecommunications system incorporating an implementation of an adaptive packet transmission system.

Referring to FIG. 4, an implementation of an adaptive packet transmission system 34 incorporated in physical units is illustrated. Radio/compression engine 36 receives a plurality of uncompressed packets through an input 38. The radio/compression engine 36 compresses the uncompressed packets and transmits them using an existing adaptive refresh rate through a wireless communication channel 40 to a radio/decompression engine 42. The radio/decompression engine 42 decompresses the compressed packets and reports errors and successes to a refresh rate calculator unit 44 that calculates a new adaptive refresh rate and transmits that new adaptive refresh rate across a wireless (or optionally wired) communication channel 46 to a refresh rate feeder unit 48 coupled to the radio/decompression engine 36. The radio/decompression engine 36 also transmits the decompressed packets into output 43.

The radio/compression engine 36 could take the form of, by non-limiting example, a wireless radio, a wireless access point, a wireless network switch, a combined wireless router and cable modem, a satellite receiver/transmitter or any other telecommunication device capable of transmitting a packet across a telecommunication channel. The compression engine component may be coupled with the radio component of the radio/compression engine 36 as software contained in computer readable instructions on computer readable media, as a logic circuit contained in at least one integrated circuit chip or on a circuit board, or through a combination of software and circuit components. The decompression engine component of the radio/decompression engine 42 may be coupled to the radio component in a similar way using similar structures and/or software instructions.

The refresh rate calculator 44 may be a separate standalone hardware unit as illustrated in FIG. 4, or may incorporated into the radio/decompression engine 42 through software contained in computer readable instructions on computer readable media, as a logic circuit contained in at least one integrated circuit chip or on a circuit board, or through a combination of software and circuit components. In a similar fashion, the refresh rate feeder 48 may be configured as a separate standalone hardware unit or incorporated as part of the radio/compression engine substantially similarly to the refresh rate calculator 44.

Implementations of an adaptive packet transmission system may include the compression engine/refresh rate feeder and decompression engine/refresh rate calculator each incorporated inside, by non-limiting example, a single telecommunication unit, which could be a router, switch, satellite receiver and/or transmitter, or any other telecommunications device capable of transmitting a packet into a telecommunications channel. In these single unit implementations, the compression engine/refresh rate feeder and decompression engine/refresh rate calculator may each be incorporated as software contained in computer readable instructions on computer readable media, as at least one logic circuit contained in at least one integrated circuit chip or on a circuit board, or through a combination of software and circuit components. Depending upon the implementations, a plurality of single unit compression engine/refresh rate feeder and decompression engine/refresh rate calculator pairs may be incorporated as part of a telecommunications network such as, by non-limiting example, switches, routers, base stations, satellite receiver/transmission stations, or any other desired kind of telecommunication hardware infrastructure.

Methods

Figure 5:
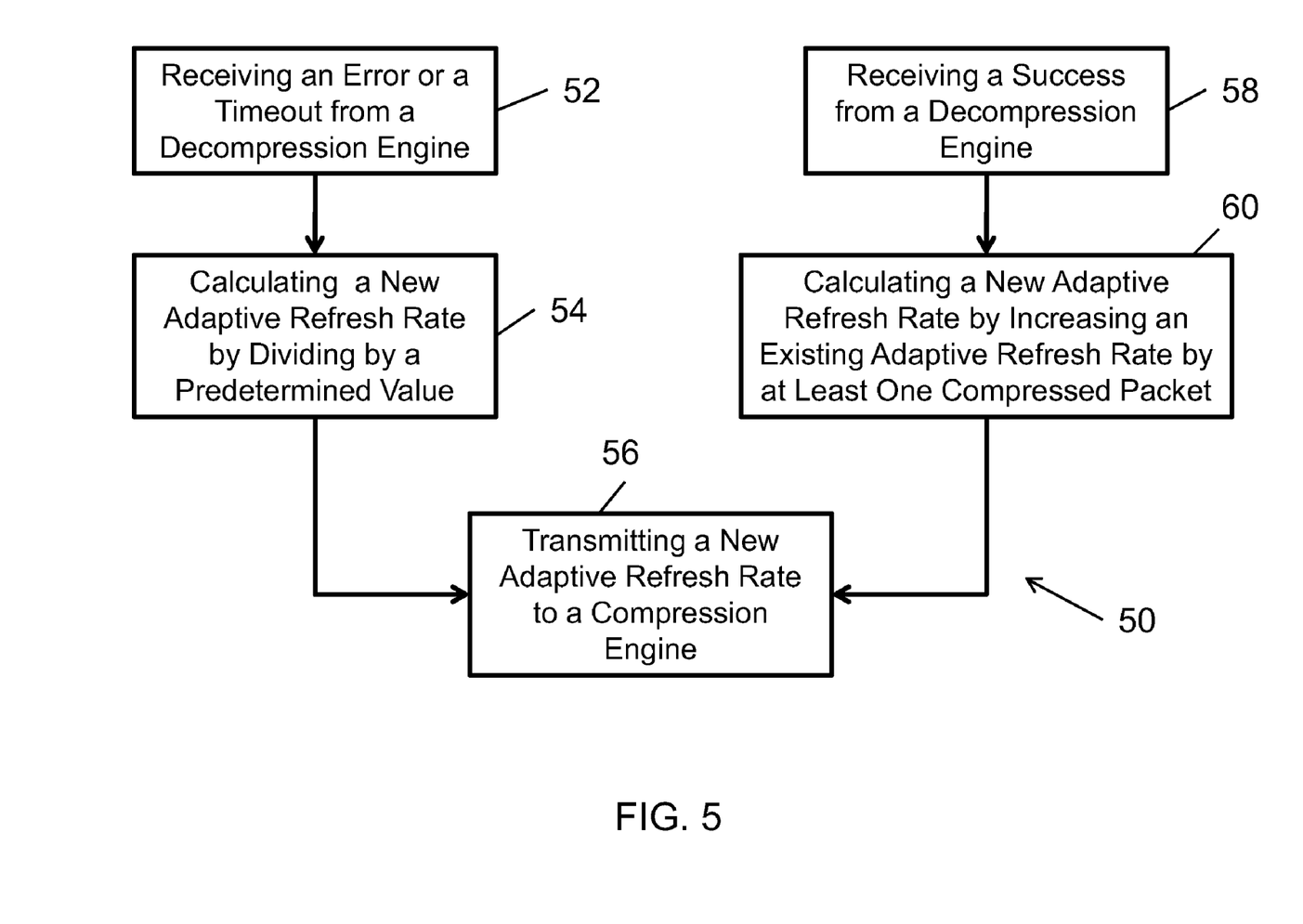
FIG. 5 is a flow diagram of an implementation of a method of calculating an adaptive refresh rate.

Referring to FIG. 5, implementations of adaptive packet transmission systems 2, 16, 26, 34 may utilize a method of calculating an adaptive refresh rate 50. Implementations of the method may include receiving an error, or a timeout, from a decompression engine (step 52), calculating a new adaptive refresh rate by dividing by a predetermined value (step 54), and transmitting a new adaptive refresh rate to a compression engine (step 56). Other implementations of the method may include receiving a success from a decompression engine (step 58), calculating a new adaptive refresh rate by increasing an existing adaptive refresh rate by at least one compressed packet (step 60), and transmitting a new adaptive refresh rate to a compression engine (step 56). In particular implementations of the method, the steps involving receiving errors and successes, calculating a new adaptive refresh rate, and transmitting the new adaptive refresh rate previously discussed may both be combined so that implementations of adaptive packet transmission systems can comprehend both errors and successes.

Figure 6:
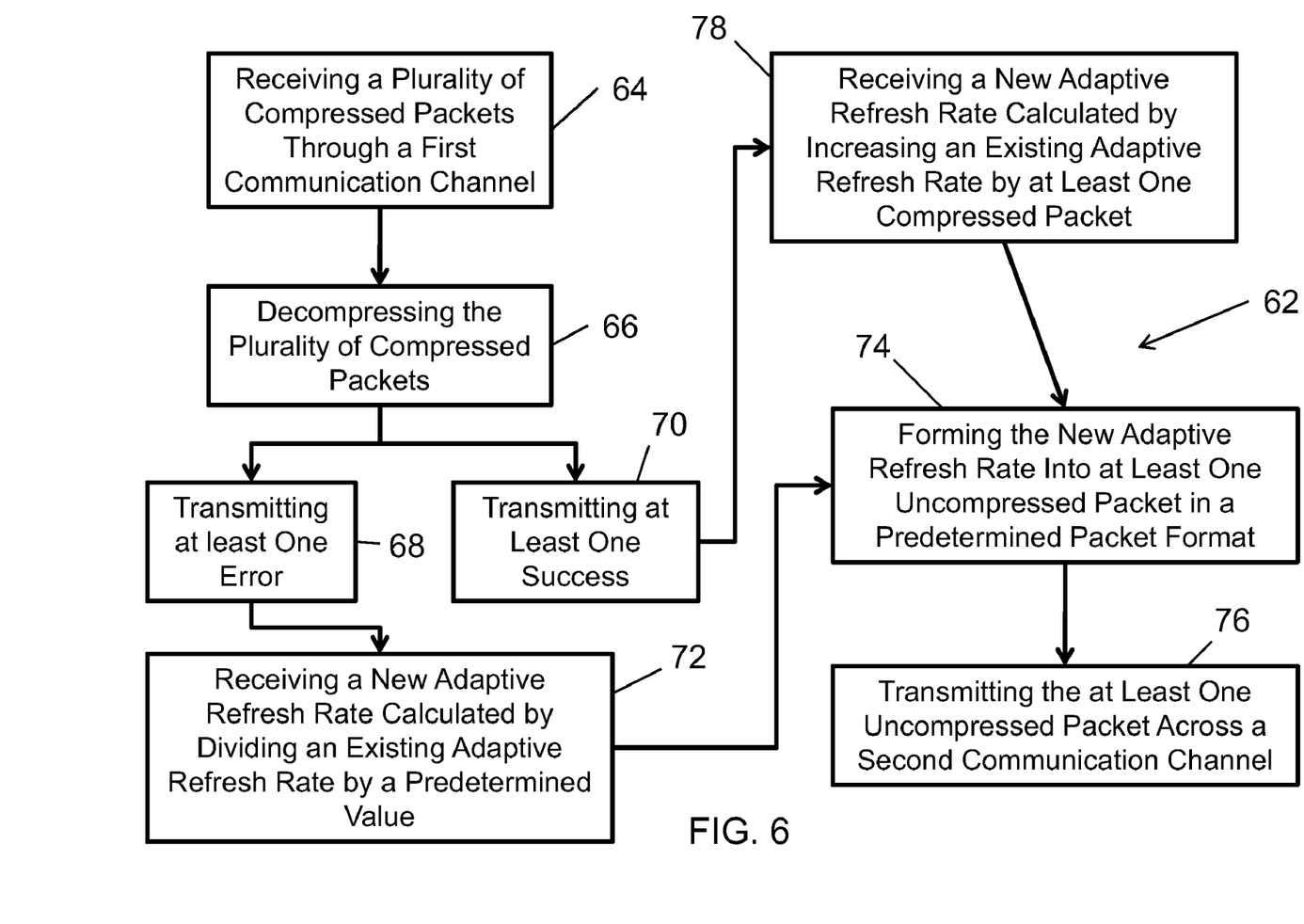
FIG. 6 is a flow diagram of an implementation of a method of transmitting an adaptive refresh rate.

Referring to FIG. 6, implementations of adaptive packet transmission systems 2, 16, 26, 34 may utilize a method of transmitting an adaptive refresh rate 62. The method may include receiving a plurality of compressed packets through a first communication channel (step 64), decompressing the plurality of compressed packets (step 66), and transmitting either at least one error (step 68) or at least one success (step 70). If at least one error was transmitted, the method may include receiving a new adaptive refresh rate calculated by dividing an existing adaptive refresh rate by a predetermined value (step 72), forming the new adaptive refresh rate into at least one uncompressed packet in a predetermined packet format (step 74), and transmitting the at least one uncompressed packet across a second communication channel (step 76). If at least one success was transmitted, the method may include receiving a new adaptive refresh rate calculated by increasing an existing adaptive refresh rate by at least one compressed packet (step 78), forming the new adaptive refresh rate into at least one uncompressed packet in a predetermined packet format (step 74), and transmitting the at least one uncompressed packet across a second communication channel (step 76). In particular implementations of the method, the steps that depend upon whether an error or a success has been transmitted may not be included.

All of the foregoing methods may be implemented in computer readable instructions contained in computer readable media executed on a computer, a logic circuit, a server, or a telecommunications platform, such as, by non-limiting example, a satellite receiver and/or transmitter, a router, an access point, a cellular telephone base station, or any other telecommunication device and/or system capable of transmitting a packet across a telecommunication channel. The foregoing methods may also be implemented in at least one integrated circuit or through circuit components formed on at least one circuit board and included in a stand-alone unit or incorporated in a larger piece of telecommunications equipment capable of transmitting a packet across a telecommunication channel.

It will be understood that implementations are not limited to the specific components disclosed herein, as virtually any components consistent with the intended operation of a method and/or system implementation for an adaptive packet transmission system may be utilized. Accordingly, for example, although particular compression engines, decompression engines, and refresh rate calculators may be disclosed, such components may comprise any shape, size, style, type, model, version, class, grade, measurement, concentration, material, weight, quantity, and/or the like consistent with the intended operation of a method and/or system implementation for an adaptive packet transmission system may be used.

In places where the description above refers to particular implementations of adaptive packet transmission systems it should be readily apparent that a number of modifications may be made without departing from the spirit thereof and that these implementations may be applied to other adaptive packet transmission systems.

The invention claimed is:

1. An adaptive telecommunications packet transmission system comprising:
a compression engine configured to compress a header of at least one uncompressed packet and send at least one compressed packet corresponding to the at least one uncompressed packet across at least one communication channel coupled to the compression engine;
a decompression engine coupled to the at least one communication channel configured to receive from the at least one communication channel the at least one compressed packet and to decompress the header of the at least one compressed packet, the decompression engine configured to report at least one error if the header of the at least one compressed packet cannot be decompressed and to report at least one success if the header of the at least one compressed packet can be decompressed; and
a refresh rate calculator coupled to the decompression engine configured to receive the at least one error and the at least one success from the decompression engine and calculate an adaptive refresh rate as a ratio of a number of compressed packets to a number of uncompressed packets sent by the compression engine in response to the at least one error or the at least one success, the refresh rate calculator configured to send at least one uncompressed packet containing the adaptive refresh rate across the at least one communication channel to the compression engine;
wherein the compression engine is configured to transmit at least one uncompressed packet across the communication channel according to the adaptive refresh rate received from the refresh rate calculator; and wherein in a first time interval, the number of compressed packets sent across the at least one communication channel is different than the number of compressed packets in a second time interval in response to a change in the adaptive refresh rate.

2. The adaptive telecommunications packet transmission system of claim 1, wherein the at least one communication channel comprises a first communication channel and a second communication channel different from the first communication channel.

3. The adaptive telecommunications packet transmission system of claim 2, wherein the first communication channel comprises a compressed communication channel and the second communication channel comprises an uncompressed communication channel.

4. The adaptive telecommunications packet transmission system of claim 3, wherein the uncompressed packet is one of a IPv4 packet, an Ethernet packet, and an IPv6.

5. The adaptive telecommunications packet transmission system of claim 1, wherein the refresh rate calculator reduces the adaptive refresh rate by dividing an existing adaptive refresh rate by a predetermined value when at least one error is received from the decompression engine.

6. The adaptive telecommunications packet transmission system of claim 5, wherein the predetermined value is one of two, three, and four.

7. The adaptive telecommunications packet transmission system of claim 5, wherein the refresh rate calculator increases the adaptive refresh rate by increasing an existing adaptive refresh rate by at least one compressed packet when at least one success is received from the decompression engine.

8. The adaptive telecommunications packet transmission system of claim 1, further comprising an adaptive refresh rate feeder configured to receive the at least one uncompressed packet from the communication channel and to transmit the adaptive refresh rate to the decompression engine.

9. An adaptive telecommunications packet transmission system comprising:
a compression engine configured to compress a header of at least one uncompressed packet and to send at least one compressed packet corresponding to the at least one uncompressed packet across a communication channel coupled to the compression engine;
a refresh rate calculator configured to receive at least one error and at least one success from a decompression engine and calculate an adaptive refresh rate as a ratio of a number of compressed packets to a number of uncompressed packets sent by the compression engine based on the at least one error or the at least one success, the refresh rate calculator configured to communicate an adaptive refresh rate to the compression engine;
wherein the compression engine is configured to transmit at least one uncompressed packet across the communication channel according to the adaptive refresh rate received from the refresh rate calculator; and
wherein in a first time interval, a number of compressed packets sent across the communication channel is different than a number of compressed packets in a second time interval in response to a change in the adaptive refresh rate.

10. The adaptive telecommunications packet transmission system of claim 9, further comprising a decompression engine coupled to the communication channel and configured to receive from the communication channel the at least one compressed packet and to decompress the header of the at least one compressed packet, the decompression engine configured to report at least one error if the header of the at least one compressed packet cannot be decompressed and to report at least one success if the header of the at least one compressed packet can be decompressed.

11. The adaptive telecommunications packet transmission system of claim 10, wherein the refresh rate calculator is configured to reduce the adaptive refresh rate by dividing an existing adaptive refresh rate by a predetermined value when at least one error is received from the decompression engine.

12. The adaptive telecommunications packet transmission system of claim 11, wherein the predetermined value is one of two, three, and four.

13. The adaptive telecommunications packet transmission system of claim 11, wherein the refresh rate calculator is configured to increase the adaptive refresh rate by increasing an existing adaptive refresh rate by at least one compressed packet when at least one success is received from the decompression engine.

14. The adaptive telecommunications packet transmission system of claim 10, further comprising an adaptive refresh rate feeder configured to receive the adaptive refresh rate from the refresh rate calculator and to transmit the adaptive refresh rate to the compression engine.

15. A method of transmitting an adaptive refresh rate comprising:
receiving a plurality of compressed packets from a compression engine through a first communication channel;
decompressing the plurality of compressed packets with a decompression engine;
transmitting at least one error resulting from the failure of at least one of the plurality of compressed packets to decompress and transmitting at least one success resulting from the successful decompression of at least one of the plurality of compressed packets to a refresh rate calculator coupled to the decompression engine;
receiving a new adaptive refresh rate from the decompression engine, the new adaptive refresh rate calculated by dividing an existing adaptive refresh rate by a predetermined value if at least one error was transmitted, wherein the existing adaptive refresh rate is a ratio of a number of compressed packets to a number of uncompressed packets received by the decompression engine;
receiving a new adaptive refresh rate from the decompression engine, the new adaptive refresh rate calculated by increasing the adaptive refresh rate by at least one compressed packet if at least one success was transmitted;
forming the new adaptive refresh rate into at least one uncompressed packet formatted in a predetermined packet format; and
transmitting the at least one uncompressed packet through a second communication channel to the compression engine.

16. The method of claim 15, wherein calculating the new adaptive refresh rate comprises dividing an existing refresh rate by a predetermined value.

17. The method of claim 16, wherein the predetermined value is one of two, three, and four.

18. The method of claim 15, wherein the predetermined packet format is one of IPv4, IPv6, and Ethernet.

19. A method of calculating an adaptive refresh rate comprising:
receiving at least one error from a decompression engine indicating a non-decompressable packet;
calculating a new adaptive refresh rate by dividing an existing adaptive refresh rate by a predetermined value, wherein the existing adaptive refresh rate is a ratio of a number of compressed packets to a number of uncompressed packets sent by the compression engine;

receiving at least one success from a decompression engine indicating a decompressable packet;

calculating a new adaptive refresh rate by increasing the adaptive refresh rate by at least one compressed packet; and transmitting the new adaptive refresh rate to a compression engine.

20. The method of claim 19, wherein the at least one error comprises the sum of individual errors over a predetermined interval of time.

21. The method of claim 20, wherein the at least one error comprises the sum of individual non-recoverable errors over a predetermined interval of time.

22. The method of claim 20, wherein the predetermined value is a function of one of the at least one error, the predetermined interval of time, and both the at least one error and the predetermined interval of time.

23. The method of claim 19 further comprising sending a pattern of compressed and uncompressed packets according to the new adaptive refresh rate.

24. The method of claim 19, wherein the predetermined value is one of two, three, and four.

25. The method of claim 19, wherein the at least one success comprises the sum of individual successes over a predetermined interval of time.

\* \* \* \* \*